United States Patent
Dusterhoft et al.

(10) Patent No.: US 7,267,171 B2
(45) Date of Patent: Sep. 11, 2007

(54) METHODS AND COMPOSITIONS FOR STABILIZING THE SURFACE OF A SUBTERRANEAN FORMATION

(75) Inventors: Ronald G. Dusterhoft, Katy, TX (US); Harvey Fitzpatrick, Katy, TX (US); David Adams, Katy, TX (US); Walter F. Glover, Katy, TX (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 396 days.

(21) Appl. No.: 10/972,648

(22) Filed: Oct. 25, 2004

(65) Prior Publication Data

US 2005/0059555 A1    Mar. 17, 2005

Related U.S. Application Data

(63) Continuation-in-part of application No. 10/407,643, filed on Apr. 4, 2003, now Pat. No. 6,962,200, which is a continuation-in-part of application No. 10/041,142, filed on Jan. 8, 2002, now Pat. No. 6,668,926.

(51) Int. Cl.
*E21B 43/267* (2006.01)
(52) U.S. Cl. .................. 166/280.1; 166/308.3
(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,336,980 A | 8/1967 | Rike | 166/295 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,708,013 A | 1/1973 | Dismuke | 166/276 |
| 3,709,298 A | 1/1973 | Pramann | 166/276 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,015,995 A | 4/1977 | Hess | 106/287 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 C |
| 4,074,760 A | 2/1978 | Copeland et al. | 166/276 |
| 4,085,801 A | 4/1978 | Sifferman et al. | 166/295 |

(Continued)

FOREIGN PATENT DOCUMENTS

CA        2063877        5/2003

(Continued)

OTHER PUBLICATIONS

Almond, et al, *Factors Affecting Proppant Flowback with Resin Coated Proppants, SPE 30096*, published 1995, Society of Petroleum Engineers, Inc., pp. 171-186.

(Continued)

*Primary Examiner*—Zakiya W. Bates
(74) *Attorney, Agent, or Firm*—Robert A. Kent; Baker Botts

(57) ABSTRACT

Methods comprising providing a fracturing fluid comprising proppant particulates at least partially coated with a hardenable resin composition that comprises a hardenable resin component and a hardening agent component, wherein the hardenable resin component comprises a hardenable resin and wherein the hardening agent component comprises a hardening agent, a silane coupling agent, and a surfactant; introducing the fracturing fluid into at least one fracture within the subterranean formation; depositing at least a portion of the proppant particulates in the fracture; allowing at least a portion of the proppant particulates in the fracture to form a proppant pack; and, allowing at least a portion of the hardenable resin composition to migrate from the proppant particulates to a fracture face.

40 Claims, No Drawings

U.S. PATENT DOCUMENTS

| | | | |
|---|---|---|---|
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 424/404 |
| 4,443,347 A | 4/1984 | Underdown et al. | 507/219 |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/280 |
| 4,526,695 A | 7/1985 | Erbstosser et al. | 252/8.55 R |
| 4,527,627 A | 7/1985 | Graham et al. | 166/280.2 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 507/269 |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 507/220 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280.2 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280.2 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,105,886 A | 4/1992 | Strubhar et al. | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutta et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Csabi et al. | 521/63 |
| 5,232,961 A | 8/1993 | Murphey et al. | 532/414 |
| 5,238,068 A | 8/1993 | Fredrickson | 166/307 |
| 5,247,059 A | 9/1993 | Gruber et al. | 528/354 |
| 5,249,628 A | 10/1993 | Surjaatmada | 166/305 |
| 5,256,729 A | 10/1993 | Kutta et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280.2 |
| 5,332,037 A | 7/1994 | Schmidt et al. | 166/276 |
| 5,335,726 A | 8/1994 | Rodrigues | 166/295 |
| 5,351,754 A | 10/1994 | Hardin et al. | 166/249 |
| 5,358,051 A | 10/1994 | Rodrogues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280.2 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280.2 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/290 |
| 5,547,023 A | 8/1996 | McDaniel et al. | 166/280 |
| 5,551,513 A | 9/1996 | Surles et al. | 166/278 |
| 5,551,514 A | 9/1996 | Nelson et al. | 166/280.2 |
| 5,582,249 A | 12/1996 | Caveny et al. | 166/276 |
| 5,582,250 A | 12/1996 | Constien | 166/280 |
| 5,588,488 A | 12/1996 | Vijn et al. | 166/293 |
| 5,591,700 A | 1/1997 | Harris et al. | 507/204 |

| Patent | Date | Inventor | Class |
|---|---|---|---|
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 166/280.2 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280.2 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280.2 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,644 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280.2 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1 | 6/2002 | McDaniel et al. | 428/402 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |

| | | | |
|---|---|---|---|
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengel et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 6,978,836 B2 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lunghofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Wilbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0034862 A1 | 2/2005 | Nguyen et al. | 166/281 |
| 2005/0045326 A1 | 3/2005 | Nguyen | 166/278 |

FOREIGN PATENT DOCUMENTS

| | | |
|---|---|---|
| EP | 0 313 243 A2 | 4/1989 |
| EP | 0 313 243 A3 | 4/1989 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0 864 726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1 326 003 A1 | 7/2003 |
| EP | 1362978 A1 | 11/2003 |
| EP | 1 394 355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1107584 | 3/1968 |
| GB | 1264180 | 12/1969 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |
| WO | WO 05/021928 A2 | 3/2005 |

OTHER PUBLICATIONS

Foreign Search Report (CPW 21582 EP).

Halliburton, *CoalStim<sup>SM</sup> Service, Helps Boost Cash Flow From CBM Assets*, Stimulation, HO3679 Oct. 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.

Halliburton Technical Flier—Multi Stage Frac Completion Methods, 2 pages, undated.

Halliburton "*CobraFrac<sup>SM</sup> Service, Coiled Tubing Fracturing—Cost-Effective Method for Stimulating Untapped Reserves*", 2 pages, 2004.

Halliburton "*CobraJetFrac<sup>SM</sup> Service, Cost-Effective Technology That Can Help Reduce Cost per BOE Produced, Shorten Cycle time and Reduce Capex*", undated.

Halliburton Cobra Frac Advertisement, 2001.

Halliburton "*SurgiFrac<sup>SM</sup> Service, a Quick and cost-Effective Method to Help Boost Production From Openhole Horizonal Completions*", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al, 1986.

Owens et al., *Waterflood Pressure Pulsing for Fractured Reservoirs*, SPE 1123, 1966.

Felsenthal et al., *Pressure Pulsing—An Improved Method of Waterflooding Fractured Reservoirs*, SPE 1788.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*", SPE 17587, 1988.

Dusseault et al, "*Pressure Pulse Workovers in Heavy Oil*", SPE 79033, 2002.

Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Alberston, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "*Poly(phenyllactide): Synthesis, Characterization, and Hydrolytic Degradation, Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch. 12, pp. 147-159, 2001.

Cantu et al., "*Laboratory and Field Evaluation of a Combined Fluid-Loss Control Additive and Gel Breaker for Fracturing Fluids*," SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective In Level 1 Dual-Lateral Completion*" SPE 78697, 2002.

Albertsson et al., "*Aliphatic Polyesters: Synthesis, Properties and Applications*", Advances in Polymer Science, vol. 57 Degradable Aliphatic Polyesters, 2002.

Dechy-Cabaret et al., "*Controlled Ring-Operated Polymerization of Lactide and Glycolide*" American Chemical Society, Chemical Reviews, A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795), undated.

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2, undated.

CDX Gas, "*What is Coalbed Methane?*" CDX, LLC. Available @ www.cdxgas.com/what.html, printed p. 1, undated.

Halliburton brochure entitled "H2Zero™ Service Introducing The Next Generation of cost-Effective Conformance Control Solutions", 2002.

Halliburton brochure entitled INJECTROL® A Component: 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Yoary Attia, et al.., "*Adsorption Thermodynamics of a Hydrophobic Polymeric Flocculant on Hydrophobic Colloidal Coal Particulates,*" American Chemical Society, p. 2203-2207, 1991.

METHODS AND COMPOSITIONS FOR STABILIZING THE SURFACE OF A SUBTERRANEAN FORMATION

CROSS-REFERENCE TO RELATED APPLICATION

This Application is a Continuation-In-Part of U.S. application Ser. No. 10/407,643 entitled "Methods and Compositions for Consolidating Proppant in Subterranean Fractures," filed on Apr. 4, 2003 now U.S. Pat. No. 6,962,200, which is a Continuation-In-Part of U.S. application Ser. No. 10/041,142 filed on Jan. 8, 2002 now U.S. Pat. No. 6,668,926.

BACKGROUND OF THE INVENTION

The present invention relates to methods and compositions of stabilizing a surface within a subterranean formation or fracture. More particularly, the present invention relates to stabilizing surfaces within a subterranean formation or fracture using particulates coated with a consolidating liquid.

Hydrocarbon-producing wells are often stimulated by hydraulic fracturing treatments. In hydraulic fracturing treatments, a viscous fracturing fluid, which also functions as a carrier fluid, is pumped into a producing zone at a rate and pressure such that one or more fractures are formed in the zone. Typically, particulates, such as graded sand, suspended in a portion of the fracturing fluid are then deposited in the fractures when the fracturing fluid is converted to a thin fluid to be returned to the surface. These particulate solids, or "proppant particulates," serve to prevent the fractures from fully closing so that conductive channels are formed through which produced hydrocarbons can flow.

Proppant particulates deposited in the fractures have been coated with hardenable resins or tackifying agents in order to prevent or reduce the subsequent flowback of proppant particulates and/or other particulates with the produced fluids. These coatings help to consolidate the proppant into a hard, permeable pack while allowing small amounts of deformation at the surface of the proppant packs to reduce the effects of point loading and/or to reduce proppant crushing.

Most proppant pack treatments have focused on consolidating the proppant pack itself, neglecting the importance of the interaction between the mechanical properties of the subterranean formation in which the proppant pack is placed and the proppant pack. These interactions can have a dramatic effect on overall fracture conductivity as well. In particular, under high stress and/or high flow conditions, formation material can intrude into the proppant pack, potentially damaging the pack. The intrusion of formation material into the proppant pack can also increase the amount of point loading and/or proppant crushing experienced by the proppant pack. These phenomena can reduce the overall conductivity of the propped fracture and/or the permeability of the proppant pack, which may negatively affect the production of the well.

SUMMARY OF THE INVENTION

The present invention relates to methods and compositions of stabilizing a surface within a subterranean formation or fracture. More particularly, the present invention relates to stabilizing surfaces within a subterranean formation or fracture using particulates coated with a consolidating liquid.

One embodiment of the present invention provides a method of fracturing a subterranean formation, comprising providing a fracturing fluid comprising proppant particulates at least partially coated with a hardenable resin composition that comprises a hardenable resin component and a hardening agent component, wherein the hardenable resin component comprises a hardenable resin and wherein the hardening agent component comprises a hardening agent, a silane coupling agent, and a surfactant; introducing the fracturing fluid into at least one fracture within the subterranean formation; depositing at least a portion of the proppant particulates in the fracture; allowing at least a portion of the proppant particulates in the fracture to form a proppant pack; and, allowing at least a portion of the hardenable resin composition to migrate from the proppant particulates to a fracture face.

Another embodiment of the present invention provides a method of stabilizing a surface of a subterranean fracture, comprising providing a treatment fluid comprising proppant particulates at least partially coated with a hardenable resin composition that comprises a hardenable resin component and a hardening agent component, wherein the hardenable resin component comprises a hardenable resin and wherein the hardening agent component comprises a hardening agent, a silane coupling agent, and a surfactant; introducing the treatment fluid into the subterranean fracture; depositing the proppant particulates in the subterranean fracture so as to form a proppant pack; and, allowing at least a portion of the hardenable resin composition to migrate from the proppant particulates to a surface within the fracture.

The features and advantages of the present invention will be readily apparent to those skilled in the art upon a reading of the description of the preferred embodiments that follows.

DESCRIPTION OF PREFERRED EMBODIMENTS

The present invention relates to methods and compositions of stabilizing a surface within a subterranean formation or fracture. More particularly, the present invention relates to stabilizing surfaces within a subterranean formation or fracture using particulates coated with a consolidating liquid.

In accordance with the present invention, proppant particulates coated with a hardenable resin composition may be used to stabilize a surface within a subterranean formation, such as the face of a fracture or the walls of a well bore. In the methods of the present invention, the hardenable resin composition is coated onto a proppant particulate in a flowable (substantially liquid) form and remains flowable at least until the coated proppant particulate is placed in contact with a surface within the subterranean formation. Once deposited on or near a surface within a subterranean formation, the hardenable resin composition may migrate from the proppant to the surface where it may then act to at least partially stabilize the surface. This stabilization of the surface may dramatically improve the permeability of a proppant pack placed within a fracture wherein the face has been so stabilized. Furthermore, stabilization of a fracture face may prevent the intrusion of formation material into the proppant pack, minimizing the damage that can occur to the proppant pack under high stress and/or high flow conditions.

Generally, any treatment fluid suitable for use in a subterranean application may be used in accordance with the teachings of the present invention, including aqueous gels, viscoelastic surfactant gels, oil gels, foams, and emulsions. Suitable aqueous gels are generally comprised of water and one or more gelling agents. Suitable emulsions can be comprised of two immiscible liquids such as an aqueous gelled liquid and a liquefied gas, such as carbon dioxide or nitrogen. In exemplary embodiments of the present invention, the fracturing fluids are aqueous gels that comprise water, a gelling agent for increasing viscosity, and, optionally, a crosslinking agent for crosslinking the gelling agent to further increase the viscosity of the fluid to form a crosslinked treatment fluid. The increased viscosity of the gelled, or gelled and cross-linked, treatment fluid, among other things, reduces fluid loss and allows the fracturing fluid to transport significant quantities of suspended proppant particles. The water used to form the fracturing fluid may be salt water, brine, or any other aqueous liquid that does not adversely react with the other components.

A variety of gelling agents may be used, including hydratable polymers that contain one or more functional groups such as hydroxyl, carboxyl, sulfate, sulfonate, amino, or amide groups. Suitable gelling typically comprise polysaccharides, biopolymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein Crosslinking agents may be used to crosslink gelling agent molecules to form crosslinked gelling agents. Crosslinkers typically comprise at least one metal that is capable of crosslinking at least two gelling agent molecules. Examples of suitable crosslinkers include, but are not limited to, zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified treatment fluids of the present invention in an amount sufficient to provide, among other things, the desired degree of crosslinking between gelling agent molecules. In certain exemplary embodiments of the present invention, the crosslinkers may be present in an amount in the range from about 0.001% to about 10% by weight of the water in the fracturing fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place proppant particles in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

In particular embodiments of the present invention, the proppant particles may be of a size such that formation fines that may migrate with produced fluids are prevented from being produced from the subterranean zone. Any suitable proppant may be used, including sand, nut shells, seed shells, bauxite materials, ceramic materials, glass materials, polymer beads, composite particles, resinous materials, resinous materials comprising nut shells and/or seed shells, combinations thereof, and the like. Generally, the proppant particles have a size in the range of from about 2 mesh to about 400 mesh, U.S. Sieve Series. In some embodiments of the present invention, the proppant is graded sand having a particle size in the range of from about 10 mesh to about 70 mesh, U.S. Sieve Series. In particular embodiments, preferred sand particle size distribution ranges are one or more of 10-20 mesh, 20-40 mesh, 40-60 mesh, or 50-70 mesh, depending on the particular size and distribution of formation solids to be screened out by the proppant particles. It should be understood that the term "proppant," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture, are often included in proppant and gravel treatments to, among other things, increase the conductivity of a resulting pack by forming highly conductive channels.

Generally, the proppant particulates of the present invention are at least partially coated with a hardenable resin composition comprised of a hardenable resin component and a hardening agent component.

The hardenable resin component of the present invention is comprised of a hardenable resin and, optionally, a solvent. Examples of hardenable resins that can be used in the hardenable resin component include, but are not limited to, organic resins such as bisphenol A diglycidyl ether resin, butoxymethyl butyl glycidyl ether resin, bisphenol A-epichlorohydrin resin, polyepoxide resin, novolak resin, polyester resin, phenol-aldehyde resin, urea-aldehyde resin, furan resin, urethane resin, a glycidyl ether resin, and combinations thereof. The hardenable resin used is included in the hardenable resin component in an amount in the range of from about 60% to about 100% by weight of the hardenable resin component. In some embodiments the hardenable resin used is included in the hardenable resin component in an amount of about 70% to about 90% by weight of the hardenable resin component.

Any solvent that is compatible with the hardenable resin and achieves the desired viscosity effect is suitable for use in the hardenable resin component of the integrated consolidation fluids of the present invention. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents include aqueous dissolvable solvents, such as methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure. As described above, use of a solvent in the hardenable resin component is optional but may be desirable to reduce the viscosity of the hardenable resin component for ease of handling, mixing, and transferring. It is within the ability of one skilled in the art, with the benefit of this disclosure, to determine if and how much solvent is needed to achieve a suitable viscosity. In some embodiments the amount of the solvent used in the hardenable resin component is in the range of from about 0.1% to about 30% by weight of the hardenable resin component. Optionally, the hardenable resin component may be heated to reduce its viscosity, in place of, or in addition to, using a solvent.

The hardening agent component of the present invention comprises a hardening agent; a silane coupling agent; and a surfactant for, among other things, facilitating the coating of the resin on the proppant particles and for causing the hardenable resin to flow to the contact points between adjacent resin-coated proppant particulates. Optionally, a hydrolysable ester may be included for, among other things, breaking gelled fracturing fluid films on the proppant particles. In particular embodiments, a liquid carrier fluid also may be included, e.g., to reduce the viscosity of the hardenable resin component for ease of handling, mixing and transferring.

Examples of the hardening agents that can be used in the liquid hardening agent component of the two-component consolidation fluids of the present invention include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The chosen hardening agent often affects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F. The hardening agent used is included in the liquid hardening agent component in an amount sufficient to consolidate the coated particulates. In some embodiments of the present invention, the hardening agent used is included in the liquid hardenable resin component in the range of from about 40% to about 60% by weight of the liquid hardening agent component. In some embodiments the hardening agent used is included in the liquid hardening agent component in an amount of about 45% to about 55% by weight of the liquid hardening agent component.

The silane coupling agent may be used, among other things, to act as a mediator to help bond the resin to formation particulates and/or proppant. Examples of suitable silane coupling agents include, but are not limited to, N-beta-(aminoethyl)-gamma-aminopropyltrimethoxysilane, N-2-(aminoethyl)-3-aminopropyltrimethoxysilane, 3-glycidoxypropyltrimethoxysilane, and combinations thereof. The silane coupling agent used is included in the liquid hardening agent component in an amount capable of sufficiently bonding the resin to the particulate. In some embodiments of the present invention, the silane coupling agent used is included in the liquid hardenable resin component in the range of from about 0.1% to about 3% by weight of the liquid hardening agent component.

Any surfactant compatible with the hardening agent and capable of facilitating the coating of the resin onto particles in the subterranean formation may be used in the hardening agent component of the integrated consolidation fluids of the present invention. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, one or more nonionic surfactants, and combinations thereof. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. The surfactant or surfactants used are included in the liquid hardening agent component in an amount in the range of from about 1% to about 15% by weight of the liquid hardening agent component. In some embodiments the surfactant or surfactants used is included in the hardenable resin component in an amount of about 3% to about 12% by weight of the hardening agent component.

While not required, examples of hydrolysable esters that can be used in the hardening agent component of the integrated consolidation fluids of the present invention include, but are not limited to, a mixture of dimethylglutarate, dimethyladipate, and dimethylsuccinate; sorbitol; catechol; dimethylthiolate; methyl salicylate; dimethyl salicylate; dimethylsuccinate; ter-butylhydroperoxide; and combinations thereof. When used, a hydrolysable ester is included in the hardening agent component in an amount in the range of from about 0.1% to about 3% by weight of the hardening agent component. In some embodiments a hydrolysable ester is included in the hardening agent component in an amount in the range of from about 1% to about 2.5% by weight of the hardening agent component.

Use of a diluent or liquid carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. Some preferred liquid carrier fluids are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred liquid carrier fluids include aqueous dissolvable solvents such as, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate liquid carrier fluid is dependent on the resin composition chosen and is within the ability of one skilled in the art with the benefit of this disclosure. It should within the ability of one skilled in the art, with the benefit of this disclosure, to determine if and how much liquid carrier fluid is needed to achieve a desired viscosity. In some embodiments the liquid carrier fluid comprises from about 20% to about 40% of the hardening agent component. Optionally, the hardening agent component may be heated to reduce its viscosity, in place of, or in addition to, using a liquid carrier fluid.

In particular embodiments of the present invention, proppant particulates are coated with the hardenable resin composition, typically on-the-fly, the coated proppant particulates are suspended in the fracturing fluid, also typically on-the-fly, and the resulting hardenable resin composition-coated proppant particles are placed in one or more fractures formed in a subterranean zone. The term "on-the-fly" is used herein to mean that a flowing stream is continuously introduced into another flowing stream so that the streams are combined and mixed while continuing to flow as a single stream as part of an ongoing treatment. Forming a hardenable resin composition, coating the proppant particles with the hardenable resin composition, and mixing the hardenable resin-coated proppant particles with the fracturing fluid may be typically performed on-the-fly. Such mixing can also be described as "real-time" mixing. As is well understood by those skilled in the art such mixing may also be accomplished by batch or partial batch mixing. One benefit of on-the-fly mixing over batch or partial batch mixing, however, involves reducing waste of the hardenable resin component and hardening agent component. Once the hardenable resin component and hardening agent component are mixed, the mixture must be used quickly or the resin will cure and the mixture will no longer be useable. Thus, if the components are mixed and then circumstances dictate that the well operation be stopped or postponed, the mixed components may quickly become unusable. By having the ability to rapidly shut down the mixing of the hardenable resin composition components on-the-fly, this unnecessary waste can be avoided, resulting in, among other things, increased efficiency and cost savings.

As mentioned above, during the time that the hardenable resin component and the hardening agent component are mixed and coated on the proppant particulates, the rate of addition of the hardening agent component can be varied while the rate of addition of the hardenable resin component is held constant. Stated another way, in addition to varying whether or not the proppant particulates are coated at all, the volume ratio of the hardening agent component to the hardenable resin component on those particulates that are coated may be varied as well. This volume ratio may be varied to obtain a desired level of consolidation or toughness for the proppant pack. For example, by increasing the volume ratio of the hardening agent component to the hardenable resin component, the proppant pack may possess a more elastic structure as compared to that when using a reduced volume ratio of the hardening agent component to the hardenable resin component. It should be within the ability of one of ordinary skill in the art, with the benefit of this disclosure, to determine the suitable ratio of components to meet the desired goals.

Once the hardenable resin composition-coated proppant particulate is deposited into the subterranean fracture, at least a portion of the hardenable resin composition tends to migrate from the surface of the proppant to a surface with the abutting subterranean formation. This migration is thought to be possible, in part, because the hardenable resin composition is coated on the proppant particulates in a flowable form and remains flowable at least until the coated proppant particulates are placed in contact with a surface within the subterranean formation. Generally, at least a portion of the resin on the proppant particulates in contact with the fracture face migrates from the proppant to the fracture face through one or more forms of mass transfer (e.g., capillary action, diffusion, adhesion). For example, the resin may migrate onto the fracture face as a result of the capillary action of formation sand that causes the resin to spread, smear, and/or coat onto the formation grains. This migration of the hardenable resin composition from the proppant particulates to the fracture face may allow for enhanced fracture conductivity under low stress conditions. Under high stress conditions and/or high flow rate conditions, the amount of formation material intruding into the proppant pack may also be reduced. Even under extreme stress conditions where the proppant particulate crushes, the fracture stabilization provided by particular embodiments of the present invention may also be beneficial. Under extreme stress conditions, the use of uncoated proppant particulates may result in excessive amounts formation fines migrating into the pore spaces of a proppant pack. However, the stabilization provided by particular embodiments of the present invention may reduce the amount of formation fines migrating and penetrating into the proppant pack, helping to keep the pore spaces between the proppant grains from being plugged by the formation particulate, and to maintain the flow path and the conductivity of the propped fracture.

The coating of hardenable resin composition onto proppant particulates may provide some advantages as compared to uncoated proppant particulates. Such advantages include, among other things, providing a stable, consolidated, and permeable pack able to at least partially withstand the effects of stress cycling and prevent proppant from flowing out of the fracture during production of the well; allowing fines or fine fragments generated from crushed proppant as a result of being exposed to high closure stresses of closing fracture to be confined or entrapped inside the resin layer encapsulating the proppant, so they cannot disperse and migrate within the proppant pack; stabilizing the formation materials along the fracture face to keep them from invading into and migrating in the proppant pack, causing pore spaces to be plugged; and increasing the effective contact area between the proppant particulates and the fracture face through accumulation of the resin at the contact points, which may reduce the point load stresses applied as the fracture closes and may thus reduce the amount of formation embedment or intrusion into the proppant pack.

To facilitate a better understanding of the present invention, the following examples of preferred embodiments are given. In no way should the following examples be read to limit or define the scope of the invention.

EXAMPLES

Example 1

Six sets of experiments were performed to evaluate three different types of proppant particulates and a liquid curable resin ("LCR") in fracturing operations. The LCR used was a two-component high temperature epoxy resin system and was coated onto the proppant particulates in an amount of about 3% by weight of proppant particulates. The proppant particulate types tested included 20/40 bauxite (rated to handle up to about a 12,000-psi stress load), 18/40 intermediate strength proppant (ISP, rated to handle up to about an 8,000-psi stress load), and 20/40 economical lightweight proppant (ELP, rated to handle up to about a 6,000-psi stress load). The test temperature was steady at 250° F. for all tests. Stress was increased over a period of several days from 2,000 psi to 12,000 psi, allowing measurements to be taken at each condition. A baseline test of uncoated proppant particulates was performed for each material, and each type of proppant particulates was tested with a LCR that would cure over time to form a hard coating and a strong mechanical bond between the proppant grains.

The effects of the closure stresses and flow rates on resin-treated proppant were evaluated with an API-linear conductivity cell. Each proppant sample was placed between the two core slabs within the test cell. The proppant particulates were leveled with a blade device inside the cell before being sandwiched between the core wafers to form a cell assembly. The cell was staked to within 0.002 inches from top to bottom and positioned between the plates of a Dake Press. Each cell was made a part of the three-cell evaluation stack, which included control (i.e., uncoated) proppant particulates and LCR-treated proppant particulates.

To measure conductivity, the test cell was loaded with the appropriate proppant pack placed between Ohio sandstone wafers and placed into the press where closure stress and temperature were applied to the specified test conditions. Pressure was increased to 500 psi, and the system was evacuated and saturated with 2% KCl at 70° F.-75° F. Once saturated, the closure pressure was increased to 1,000 psi, at a rate of 100 psi/min.

Conductivity was then measured with a flow through the proppant pack. The flow rate pressure differential and average width were measured at each pressure to calculate the conductivity and permeability. Five measurements were taken and averaged to arrive at each reported conductivity. Flow rate was measured with a Liquiflow meter calibrated with a Mettler balance to 0.01 ml/min. Darcy's Law was used for the calculations to determine the conductivity and permeability.

The test temperature was then increased to 250° F. and allowed to equilibrate. The temperature was maintained at 250° F. for 12 hours before increasing the closure stress. The conductivity and permeability of the proppant were then determined at 1,000 psi and 250° F. The closure stress was then increased at a rate of 100 psi/min to the next closure stress, and conductivity and permeability measurements were taken as described above.

The conductivity and permeability of each proppant pack was continuously monitored at 2,000 psi and 250° F. for a minimum of 25 to 30 hours. Following this time period, a high-velocity, non-Darcy gas evaluation was performed by increasing the gas rate to an equipment maximum of about 290 standard liters per minute ("SLM") and flowing until pressure differential flat lines (dry state) were obtained. The flow rate was then decreased, stopping at selected intermittent rates, until 30 to 35 SLM was achieved. A secondary calibrated Flow Prover monitored the gas flow rate at the exit of the test cell for the calculation of the gas flow rate. Zeros were rechecked, and the rate was increased back to the previous highest flow rate and the down-rate ramp repeated. As closure stresses increased, the highest velocity was limited by imposing a maximum pressure drop limit of 50 psi/5 inches for the pressure differential (and/or maximum equipment flowing pressure was obtained versus flow rate). Following each gas evaluation of the test cells at 2,000 psi closure stresses, 2% KCl was re-introduced into the proppant pack and the cell was de-gassed before a final measurement of conductivity was obtained.

The conductivity and permeability of the proppant packs were also measured at closure stresses of 4,000; 6,000; 8,000; 10,000; and 12,000 psi. In several tests, steel plates were used to encase the proppant pack to help differentiate the effects of curable resin in controlling fines that have been generated from crushed proppant or from fines that have been introduced from the Ohio core wafers.

For all three proppants, there was a significant increase in fracture conductivity and proppant pack permeability for the LCR-coated proppants versus the uncoated proppants. The improvement in fracture conductivity and proppant pack permeability was pronounced under the lower stress conditions. Under lower stress conditions, the LCR-coated proppants showed a near-parallel trend to the uncoated proppants, essentially showing that the proppant pack permeability and fracture conductivity of the LCR-coated proppants were consistently higher than those of the uncoated proppants. In all cases, there was a stress at which the conductivity of the LCR-coated proppants began to converge with the uncoated proppant baseline conductivity/proppant pack permeability. The point at which this convergence initiated was different for each type of proppant particulate.

The measured cell width, which corresponds closely to the width of the proppant pack, showed trends nearly identical to those seen in the proppant pack permeability and fracture conductivity. This suggests that there is greater porosity in the cells with the coated proppants as opposed to the ones with uncoated proppants.

A number of observations were made upon visual inspection of the proppant packs during disassembly of the conductivity test equipment. In all cases, there was evidence of formation material penetrating into the proppant pack. For all three proppants, the amount of formation material that appeared to be filling pore spaces in the proppant pack was much greater for the uncoated proppants. The coated proppants showed much less formation intrusion and much less formation material filling the porosity of the proppant pack. In the bauxite tests, it was difficult to make any judgment regarding the quantity of crushed proppant in the individual tests. For ISP and ELP it was possible to detect significant variation. In these cases, LCR-coated proppants showed a much more stable interface at the formation-proppant interface, and severe proppant crushing in the center of the proppant pack. The uncoated proppants showed deeper formation intrusions and much less crushed proppant in the pack. It also appeared that the intrusion of formation fines into the proppant pack reduced the point loading on the individual proppant grains, thus reducing the amount of crushing.

With the LCR-coated proppants, it appeared that there was a much more stable interface created between the proppant and formation material. The result of this behavior was actually an increase in the point loading of the proppant in the center of the pack. As a result, there was more proppant crushing when the cell was placed under extreme stress conditions for a given proppant. This suggests that stabilizing the interface between the proppant and formation material provided a means to achieve the maximum benefit from a given proppant and the effects of formation intrusion were dramatically reduced.

Visual inspection of the proppant face with the formation face removed showed that the liquid resin actually accumulated slightly at the interface between the proppant particulates and the formation face. In the case of resin material, a thin layer of formation material actually appeared to be consolidated by resin material that had been drawn from the proppant to the formation, helping to create a stable interface. It also appeared that liquid resin would cure to form a rigid interface where puddle points around each individual proppant grain consolidated from small quantities of resin are drawn by capillary forces and surface effects.

Example 2

In a single field, four wells were completed using 20/40 bauxite coated with a two-component high temperature epoxy resin to help control flow back while four offset wells were completed using more conventional resin-precoated proppant materials to control proppant flowback.

At the time the wells were completed, the primary advantage of LCR was thought to be proppant flowback control. As a result, these wells were produced more aggressively early in production in an attempt to achieve significantly higher peak production rates. After three months of production, it appeared that the LCR was on a more rapid decline and that production would drop below the production from the conventionally treated wells. New data on the LCR-coated proppant suggested that one should expect improved long-term production as well, due to an increase in short-term and long-term fracture conductivity that would be expected to provide improved reservoir access as a result of the increased effective fracture length. Production data after ten months showed that following the early production, the LCR wells actually followed a similar decline to the conventional treatments and the production rate remained significantly higher over the entire period. Cumulative gas production was dramatically higher in the wells that used LCR-coated proppant (12.9 billions of cubic feet of gas ("BCF")) as compared to those that used resin-precoated proppant (5.5 BCF).

A number of normalization curves were generated to remove variations in net height, perforated interval, reservoir permeability, and job size. With these normalizations, it became apparent that the LCR-coated proppant dramatically outperformed the conventional treatments over a period of ten months.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of fracturing a subterranean formation, comprising:
   providing a fracturing fluid comprising proppant particulates at least partially coated with a hardenable resin composition that comprises a hardenable resin component and a hardening agent component, wherein the hardenable resin component comprises a hardenable resin and wherein the hardening agent component comprises a hardening agent, a silane coupling agent, and a surfactant;
   introducing the fracturing fluid into at least one fracture within the subterranean formation;
   depositing at least a portion of the proppant particulates in the fracture; allowing at least a portion of the proppant particulates in the fracture to form a proppant pack; and,
   allowing at least a portion of the hardenable resin composition to migrate from the proppant particulates to a fracture face.

2. The method of claim 1 further comprising allowing the hardenable resin composition to substantially cure.

3. The method of claim 1 wherein the hardenable resin comprises a resin selected from the group consisting of: a bisphenol A diglycidyl ether resin, a butoxymethyl butyl glycidyl ether resin, a bisphenol A-epichlorohydrin resin, a polyepoxide resin, a novolak resin, a polyester resin, a phenol-aldehyde resin, a urea-aldehyde resin, a furan resin, a urethane resin, a glycidyl ether resin, and combinations thereof.

4. The method of claim 1 wherein the hardenable resin comprises from about 60% to about 100% by weight of the hardenable resin component.

5. The method of claim 1 wherein the hardenable resin component further comprises a solvent.

6. The method of claim 5 wherein the solvent comprises a solvent selected from the group consisting of: a butyl lactate, a butylglycidyl ether, a dipropylene glycol methyl ether, a dipropylene glycol dimethyl ether, a dimethyl formamide, a diethyleneglycol methyl ether, a ethyleneglycol butyl ether, a diethyleneglycol butyl ether, a propylene carbonate, methanol, a butyl alcohol, d-limonene, a fatty acid methyl ester, methanol, isopropanol, butanol, a glycol ether, and combinations thereof.

7. The method of claim 5 wherein the solvent comprises from about 0.1% to about 30% by weight of the hardenable resin component.

8. The method of claim 1 wherein the hardening agent comprises a hardening agent selected from the group consisting of: piperazine, a derivative piperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, .beta.-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichiorotrifluoroacetone, and combinations thereof.

9. The method of claim 1 wherein the hardening agent comprises from about 40% to about 60% by weight of the hardening agent component.

10. The method of claim 1 wherein the silane coupling agent comprises a silane coupling agent selected from the group consisting of: N-beta-(aminoethyl)-gamma-aminopropyl trimethoxysilane, N-2-(aminoethyl)-3-aminoproplyl-trimethoxysilane, 3-glycidoxypropyltrimetho-xysilane, and mixtures thereof.

11. The method of claim 1 wherein the silane coupling agent comprises from about 0.1% to about 3% by weight of the hardening agent component.

12. The method of claim 1 wherein the hardening agent component further comprises a hydrolysable ester.

13. The method of claim 12 wherein the hydrolysable ester comprises an ester selected from the group consisting of: dimethyiglutarate, dimethyladipate, sorbitol, catechol, dimethylthiolate, methyl salicylate, dimethyl salicylate, dimethylsuccinate, ter-butylhydroperoxide, and mixtures thereof.

14. The method of claim 12 wherein the hydrolysable ester comprises from about 0.1% to about 3% by weight of the hardening agent component.

15. The method of claim 1 wherein the surfactant comprises a surfactant selected from the group consisting of: an ethoxylated nonyl phenol phosphate ester, a cationic surfactant, a $C_{12}$-$C_{22}$ alkyl phosphonate surfactant, a mixture of one or more non-ionic surfactants and an alkyl phosphonate surfactant, and mixtures thereof.

16. The method of claim 1 wherein the surfactant comprises from about 1% to about 15% by weight of the hardening agent component.

17. The method of claim 1 wherein the hardening agent component further comprises a liquid carrier fluid.

18. The method of claim 17 wherein the liquid carrier fluid comprises a fluid selected from the group consisting of: a butyl lactate, a butylglycidyl ether, a dipropylene glycol methyl ether, a dipropylene glycol dimethyl ether, a dimethyl formamide, a diethyleneglycol methyl ether, a ethyleneglycol butyl ether, a diethyleneglycol butyl ether, a propylene carbonate, methanol, a butyl alcohol, d-limonene, a fatty acid methyl ester, methanol, isopropanol, butanol, a glycol ether, and combinations thereof.

19. The method of claim 17 wherein the liquid carrier fluid comprises from about 20% to about 40% by weight of the hardening agent component.

20. The method of claim 1 wherein the subterranean formation has a temperature from about 60° F. to about 225° F.

21. A method of stabilizing a surface of a subterranean fracture, comprising:
providing a treatment fluid comprising proppant particulates at least partially coated with a hardenable resin composition that comprises a hardenable resin component and a hardening agent component, wherein the hardenable resin component comprises a hardenable resin and wherein the hardening agent component comprises a hardening agent, a silane coupling agent, and a surfactant;
introducing the treatment fluid into the subterranean fracture;
depositing the proppant particulates in the subterranean fracture so as to form a proppant pack; and,
allowing at least a portion of the hardenable resin composition to migrate from the proppant particulates to a surface within the fracture.

22. The method of claim 21 further comprising allowing the hardenable resin composition to substantially cure.

23. The method of claim 21 wherein the hardenable resin comprises a resin selected from the group consisting of: a bisphenol, A-epichlorohydrin resin, polyepoxide resin, novolak resin, polyester resin, phenol-aldehyde resin, urea-aldehyde resin, furan resin, urethane resin, glycidyl resin, and mixtures thereof.

24. The method of claim 21 wherein the hardenable resin comprises from about 60% to about 100% by weight of the hardenable resin component.

25. The method of claim 21 wherein the hardenable resin component further comprises a solvent.

26. The method of claim 25 wherein the solvent comprises a solvent selected from the group consisting of: a butyl lactate, a butylglycidyl ether, a dipropylene glycol methyl ether, a dipropylene glycol dimethyl ether, a dimethyl formamide, a diethyleneglycol methyl ether, a ethyleneglycol butyl ether, a diethyleneglycol butyl ether, a propylene carbonate, methanol, a butyl alcohol, d-limonene, a fatty acid methyl ester, methanol, isopropanol, butanol, a glycol ether, and combinations thereof.

27. The method of claim 25 wherein the solvent comprises from about 0.1% to about 30% by weight of the hardenable resin component.

28. The method of claim 21 wherein the hardening agent comprises a hardening agent selected from the group consisting of: piperazine, a derivative piperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, .beta.-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof.

29. The method of claim 21 wherein the hardening agent comprises from about 40% to about 60% by weight of the hardening agent component.

30. The method of claim 21 wherein the silane coupling agent comprises a silane coupling agent selected from the group consisting of: N-beta-(aminoethyl)-gamma-aminopropyl trimethoxysilane, N-2-(aminoethyl)-3-aminopropyl-trimethoxysilane, 3-glycidoxypropyltrimetho-xysilane, and mixtures thereof.

31. The method of claim 21 wherein the silane coupling agent comprises from about 0.1% to about 3% by weight of the hardening agent component.

32. The method of claim 21 wherein the hardening agent component further comprises a hydrolysable ester.

33. The method of claim 32 wherein the hydrolysable ester comprises an ester selected from the group consisting of: dimethyiglutarate, dimethyladipate, sorbitol, catechol, dimethylthiolate, methyl salicylate, dimethyl salicylate, dimethylsuccinate, ter-butylhydroperoxide, and mixtures thereof.

34. The method of claim 32, wherein the hydrolysable ester comprises from about 0.1% to about 3% by weight of the hardening agent component.

35. The method of claim 21 wherein the surfactant comprises a surfactant selected from the group consisting of: an ethoxylated nonyl phenol phosphate ester, a cationic surfactant, a $C_{12}$-$C_{22}$ alkyl phosphonate surfactant, a mixture of one or more non-ionic surfactants and an alkyl phosphonate surfactant, and mixtures thereof.

36. The method of claim 21 wherein the surfactant comprises from about 1% to about 15% by weight of the hardening agent component.

37. The method of claim 21 wherein the hardening agent component further comprises a liquid carrier fluid.

38. The method of claim 37 wherein the liquid carrier fluid comprises a fluid selected from the group consisting of: a butyl lactate, a butylglycidyl ether, a dipropylene glycol methyl ether, a dipropylene glycol dimethyl ether, a dimethyl formamide, a diethyleneglycol methyl ether, a ethyleneglycol butyl ether, a diethyleneglycol butyl ether, a propylene carbonate, methanol, a butyl alcohol, d'limonene, a fatty acid methyl ester, methanol, isopropanol, butanol, a glycol ether, and combinations thereof.

39. The method of claim 37 wherein the liquid carrier fluid comprises from about 20% to about 40% by weight of the hardening agent component.

40. The method of claim 21 wherein the subterranean fracture has a temperature from about 60° F. to about 225° F.

* * * * *